US012760937B2

(12) United States Patent
Sameien

(10) Patent No.: US 12,760,937 B2
(45) Date of Patent: Oct. 13, 2026

(54) CLAMPING ARRANGEMENT AND MOUNTING ARRANGEMENT FOR A SOLAR CELL MODULE

(71) Applicant: SFS Group International AG, Heerbrugg (CH)

(72) Inventor: Terje Sameien, Auli (NO)

(73) Assignee: SFS Group International AG, Heerbrugg (CH)

( * ) Notice: Subject to any disclaimer, the term of this patent is extended or adjusted under 35 U.S.C. 154(b) by 275 days.

(21) Appl. No.: 18/603,571

(22) Filed: Mar. 13, 2024

(65) Prior Publication Data

US 2024/0310077 A1 Sep. 19, 2024

(30) Foreign Application Priority Data

Mar. 14, 2023 (EP) .................................... 23161928

(51) Int. Cl.
*F24S 25/636* (2018.01)
*F24S 25/16* (2018.01)
*H02S 20/23* (2014.01)
*H02S 30/10* (2014.01)

(52) U.S. Cl.
CPC ............. *F24S 25/636* (2018.05); *F24S 25/16* (2018.05); *H02S 20/23* (2014.12); *H02S 30/10* (2014.12)

(58) Field of Classification Search
CPC ......... F24S 25/16; F24S 25/636; H02S 20/23; H02S 30/10
USPC ......................................................... 52/173.3
See application file for complete search history.

(56) References Cited

U.S. PATENT DOCUMENTS

| | | | | | |
|---|---|---|---|---|---|
| 2,927,762 | A * | 3/1960 | Owsiak | A47H 1/122 | 248/262 |
| 4,967,991 | A * | 11/1990 | Simon | A47H 1/122 | 248/265 |
| 5,330,821 | A * | 7/1994 | Lo | A47H 2/02 | 248/265 |
| 5,421,551 | A * | 6/1995 | LeClaire | A47H 1/122 | 248/265 |
| 5,673,741 | A * | 10/1997 | Cairns | A47H 23/04 | 248/265 |

(Continued)

FOREIGN PATENT DOCUMENTS

| | | |
|---|---|---|
| CN | 207766212 | 8/2018 |
| DE | 9308171 U1 | 10/1994 |
| DE | 102011084213 A1 | 12/2012 |

*Primary Examiner* — James J Buckle, Jr.
(74) *Attorney, Agent, or Firm* — Volpe Koenig

(57) ABSTRACT

A clamping arrangement for solar modules includes an assembly having at least one C-shaped, longitudinally extended guide rail and first and second holders. These holders have an angle with two legs. A first leg includes a first, extended, straight section; the second, angled leg/section has a gripping section at its end to positively grip a solar module frame. The holders are inserted into longitudinal ends of the guide rail. The inner space of the guide rail has a guide dimensioned such that the first leg/section of the holders is displaceably guided therein. One eyelet each on the holder or the guide rail is connectable via a spring such that the holder is pulled into the guide of the guide rail and exerts a tensile force on the gripping section. A mounting arrangement for solar cell modules for façades includes this clamping arrangement, a mounting rail and a solar cell module.

11 Claims, 4 Drawing Sheets

(56) References Cited

U.S. PATENT DOCUMENTS

| | | | | |
|---|---|---|---|---|
| 5,996,791 | A * | 12/1999 | Bibby | B65D 85/00 206/326 |
| 7,028,960 | B2 * | 4/2006 | Goldstein | A47H 1/124 248/262 |
| 12,539,568 | B1 * | 2/2026 | Karkheck | B23P 19/04 |
| 2003/0173319 | A1 * | 9/2003 | Nei | A47H 1/022 211/105.2 |
| 2014/0026946 | A1 | 1/2014 | West et al. | |
| 2014/0290718 | A1 * | 10/2014 | Jackson, Jr. | F24S 25/11 136/251 |
| 2015/0122311 | A1 | 5/2015 | Echizenya et al. | |
| 2019/0178274 | A1 | 6/2019 | Katz | |
| 2023/0270273 | A1 * | 8/2023 | Coombs | A47H 1/122 211/105.3 |

* cited by examiner

CLAMPING ARRANGEMENT AND MOUNTING ARRANGEMENT FOR A SOLAR CELL MODULE

CROSS-REFERENCE TO RELATED APPLICATIONS

This application claims priority from European Patent Application No. 23161928, filed Mar. 14, 2023, which is incorporated herein by reference as if fully set forth.

TECHNICAL FIELD

The present invention relates to a clamping arrangement for a solar module. A clamping arrangement means an assembly which is designed and suitable for securely holding a solar module or another plate-shaped component of comparable dimensions in a clamping manner. A mounting arrangement also comprises a mounting rail for fastening to a substructure and the clamping arrangement for the solar cell module, which are hooked together into the mounting rail.

BACKGROUND

In the following, solar cell panel, solar module, solar panel or solar cell module refers to a flat arrangement of a large number of interconnected solar cells. Such solar modules are usually encapsulated to protect them from undesirable environmental influences, fitted with electrical connectors and are sold ready for installation.

Solar cell modules usually have a translucent front element (preferably glass) on the front and a protective component against the weather on the back. This component can be realized, for example, as an adhesive film, rear glass or plastic plate.

The edges are sealed to prevent the ingress of atmospheric oxygen and liquids. In addition to the actual solar cells, the current-carrying conductor tracks and other electronic components are also located inside this protective sandwich structure, depending on the size, type and output of the solar cell module. A solar module is usually sealed at the edge by a metal frame, which can also be used for mechanical attachment to a supporting structure.

This metal frame must be stable enough to dissipate wind forces and snow loads acting on the solar cell module, in addition to the dead weight of the solar module and also independent of the installation position (vertical, inclined, horizontal).

To date, most solar cell modules have been installed on the roofs of residential and industrial buildings, both on pitched and flat roofs. The solar cell modules are often aligned to the south and inclined in such a way that the energy yield is optimized on an annual average. However, the installation of solar cell modules on façades is becoming increasingly important.

Due to the installation on roof surfaces, the performance of solar cell modules is reduced if they become dirty or (partially) covered by leaves and snow. Mounting on a house façade, on the other hand, offers advantages: Less dirt accumulates and snow is also not a problem. If a solar cell module is also installed as part of a curtain-type, rear-ventilated façade, a purely passive building envelope becomes a partially active, energy-generating surface.

In order to be able to utilize these advantages without too much effort, several requirements must be met: A solar cell module must be held securely in order to meet the stability requirements already mentioned. Fastening using screws, rivets or other fasteners must only be carried out at certain points on the metal frame in order to prevent damage to the sandwich described above. This could allow moisture and oxygen to reach the actual cells and cause oxidation or short circuits. For this reason, such fixing points are often already specified or prepared by the manufacturer. Thirdly, it should be possible to remove a holder with manageable effort if one of the modules in a façade is defective or damaged.

DESCRIPTION OF THE PRIOR ART

There are various solutions to this problem in the prior art, such as fixing openings (holes, elongated holes), holders or similar attachment points provided by the manufacturer in the frame around the solar cell module. However, these require that the actual façade substructure takes into account the position of the prescribed fixing points. The façade must therefore be adapted to the intended type, size and fastening method of the solar cell modules.

The invention described below draws on the basic principle of a retaining structure comprising two identically shaped profiles that are arranged inverted relative to each other and interlock. This was shown in its basic features, for example, in the specification DE 93 08 171.5. A profile, preferably extrusion-molded, is attached horizontally to a substructure to act as a receptacle. A piece of the same profile, rotated by 180°, can be positively hooked into the receptacle.

SUMMARY

It is the object of the invention to propose a holder that does not require the fixing points provided on the frame of the solar cell module, is easy to attach and detach and can be handled flexibly in relation to the supporting substructure.

This object is solved by a clamping arrangement having one or more of the features disclosed herein. Furthermore, a mounting arrangement on a façade is described. The description and claims that follow describe variants and exemplary embodiments.

A clamping arrangement for a solar module according to the invention comprises an assembly having at least one substantially C-shaped, longitudinally extended guide rail of length s and a first and a second holder, which allow the clamping fastening. In order to allow a high degree of flexibility when using the proposed clamping arrangement with solar cell modules of different sizes and at the same time to make the attachment to the façade as invisible as possible, the length s of the guide rail is chosen to be smaller than the extension of the solar cell module at the point where it is to be clamped. The holders are arranged at the long ends of the guide rail and fastened in the inner space of the guide rail. The inner space refers to the cavity defined by the C-shape.

As in the aforementioned prior art, the C-shape can be realized as a hollow box-like profile that is open on one side in cross-section. The edge areas of this opening will also be referred to as end sections in the following.

The two holders are essentially L-shaped, i.e. basically in the form of an angle. The first leg of the holder has a first, extended, straight section of length l, width b and thickness t. The second leg has a second section that is angled towards the first leg and also has a gripping section at the open end. This is dimensioned so that it can positively grip the frame of a solar module. This design means that the gripping section can securely grip and hold the frame in terms of dimensions and forces.

These two holders and the guide rail have openings for fastening elements such as screws or rivets, which allow the holders to be fixed to the guide rail in a secure position.

According to the invention, a guide is provided in the inner space of the guide rail, which can accommodate the first section (leg) of the holders. In the usual technical understanding, a guide means a device in which a component is movable in at least one spatial direction, but is limited in other spatial directions.

For this purpose, the clamping arrangement, especially the guide provided, is preferably designed in such a way that it has essentially two U-shaped grooves that are spaced apart and whose openings face towards each other. As usual, the U-shape consists of two essentially straight, limiting side walls and a connecting knee between them, which forms the groove base.

In order to be able to accommodate and guide the first sections of the guide rail in a (longitudinally) displaceable manner, the dimensions of the guide are selected so that each of the grooves has a width w and the grooves have a distance d between them, measured from groove bottom to groove bottom. The width w of the grooves must therefore be slightly greater than the thickness t of the first sections so that some play remains. The same applies to the distance d, which is chosen to be slightly greater than the width b of the first section (leg) of the first or second holder.

A preferred solution is when a first side wall for each of the two U-shaped grooves is formed jointly by an outer wall of the guide rail. The second side wall is formed in each case as a separate, rib-shaped projection of height h, which is arranged at a parallel distance w from the first side wall. Preferably, the outer wall of the guide rail that forms approximately the center of the C-shape is selected as the first side wall.

The dimensions of the guide and the second side walls in particular can be described as follows: $w<h<5w$, in other words: the height of the second side wall is lightly dimensioned, at least as high as the width of the groove and preferably no more than five times the width w. This is sufficient for the function of the guide. Since the guide consists of two grooves arranged opposite each other and there is no compelling need to guide the first section of the first or second holder in a completely enclosing slot, it can be specified as a further preferred condition that twice the height of the second side wall should be (significantly) smaller than the distance d between the grooves, i.e. $2h<<d$. As already mentioned above, for the distance d, the opening of the guide, d is chosen to be slightly larger than the width b of the first section (leg) of the first or second holder, mathematically $d<\approx b$.

The position of the holders, if they are arranged in the guide as intended, can be secured relative to the guide rail using fasteners. These can be inserted through or arranged in overlapping openings in the guide rail as well as in the holders. It is advantageous if the first holder has an elongated hole, as this enables relative adjustability between the guide rail and the first holder.

Further advantageously, the guide rail can have a first eyelet which extends at right angles from the first side wall into the inner space of the guide rail. This eyelet is attached at a distance from the end of the guide rail that is greater than the length l of the first section of the holder. This ensures that the first eyelet does not act as a stop for the holder inserted into the guide. Such an eyelet can be realized, for example, as an attached component or as a partially punched out and bent part of the side wall of the guide rail.

As a counterpart to the first eyelet, a second eyelet is created on the first holder, which is arranged on the narrow side of the first section opposite the clamping area. If the holder is pushed into the guide, this is done with the second eyelet first. The second eyelet extends at right angles away from the plane of the first section and faces into the inner space when the first holder is properly arranged in the guide rail guide. The line of sight through the first and second eyelets will then also extend parallel to the plane of the first side wall of the guide rail.

The purpose of the eyelets is that the first and second eyelets can form stop points for a spring which, when the first holder is correctly installed in the guide, exerts a tensile force between the guide rail and the first holder. This basically pulls the holder into the guide, whereby a tensile force acts on the clamping area. The person skilled in the art can implement the spring described here as a spiral spring with end hooks for the eyelets or by using equivalent elastic tensioning elements.

The provision of the eyelets and the attachment of the spring were described for the first holder because one clamping device per clamping device is usually sufficient. The second holder can, for example, be pre-adjusted via a selection of prefabricated holes, but connected to the guide rail in an inelastic manner. In the case described, the clamping force would be provided solely by the clamping device between the first holder and the guide rail. A further securing option can be provided by appropriately providing an elongated hole in the first section of the first holder in conjunction with a single through-hole in the guide rail. During pre-assembly, a loose screw/nut connection would be provided here. After a solar cell module has been inserted into a clamping arrangement prepared in this way, the clamping arrangement can be fixed in its final position by tightening the loose screw/nut connection.

The guide rail described here can be manufactured as an extruded aluminum profile with a substantially uniform cross-section, just like the mounting rail described below. Eyelets and openings can be added in further processing steps.

The holders can also be made from aluminum as stamped and bent parts or alternatively from thin sheet steel by punching and folding.

A combination of clamping arrangement, solar module and mounting rail is described below as a mounting arrangement. This is primarily intended for use on façades, but is not limited to this. Arrangements that deviate from the vertical can also be realized.

A mounting arrangement having a solar module comprises the clamping arrangement listed above and a mounting rail. The mounting rail is designed to be attached horizontally to a load-bearing substructure. The term "substructure" is usually used to describe supporting structures that are attached at a certain distance from or to a load-bearing (exterior) building wall and serve as a receptacle for the façade elements to be suspended. These then form the visible façade. The combination of substructure and façade cladding is then referred to as the building envelope.

For mounting, the dimensions of the clamping arrangement (l, b, t, h, s . . . ), particularly in the area of the gripping section, are dimensioned so that it can securely grip the edge region or frame of a solar module. It is advantageous for mounting if both the guide rail and the mounting rail have an essentially C-shaped cross-section. The open end sections of the C-profile are advantageously shaped in such a way that they interlock when the guide rail is hooked into the mounting rail, with the openings of the C aligned with each other.

It is particularly advantageous if the first and second end sections of the guide rail and the first and second end sections of the mounting rail are designed differently, but the first end section of the mounting rail is modeled on the first mounting section of the guide rail and the second end section of the mounting rail is modeled on the second mounting section of the guide rail. As in the prior art, these end sections can be identical in pairs or compatible to the extent that the described interlocking and locking can be achieved. Interlocking is not meant here as an irreversible process, but as a connection that is permanently secured by its own weight, for example, but can be released.

A mounting arrangement of the type described can of course provide two (or more) parallel offset guide rails to secure the solar panel in the case of particularly large or heavy solar panels. These are hooked into a corresponding number of mounting rails.

Depending on the problem to be solved or regulation, a person skilled in the art will add securing means to the clamping arrangement or mounting arrangement described above. For example, the position of the gripping section on the frame of a solar cell module can be secured by a locking screw or a rivet. It is also possible to secure the connection between the guide rail and mounting rail with a locking screw. This may be necessary if high wind loads are expected on a façade.

BRIEF DESCRIPTION OF THE DRAWINGS

The invention will now be explained by way of example with reference to the accompanying drawings with reference to preferred embodiments.

DETAILED DESCRIPTION

Figure 1:
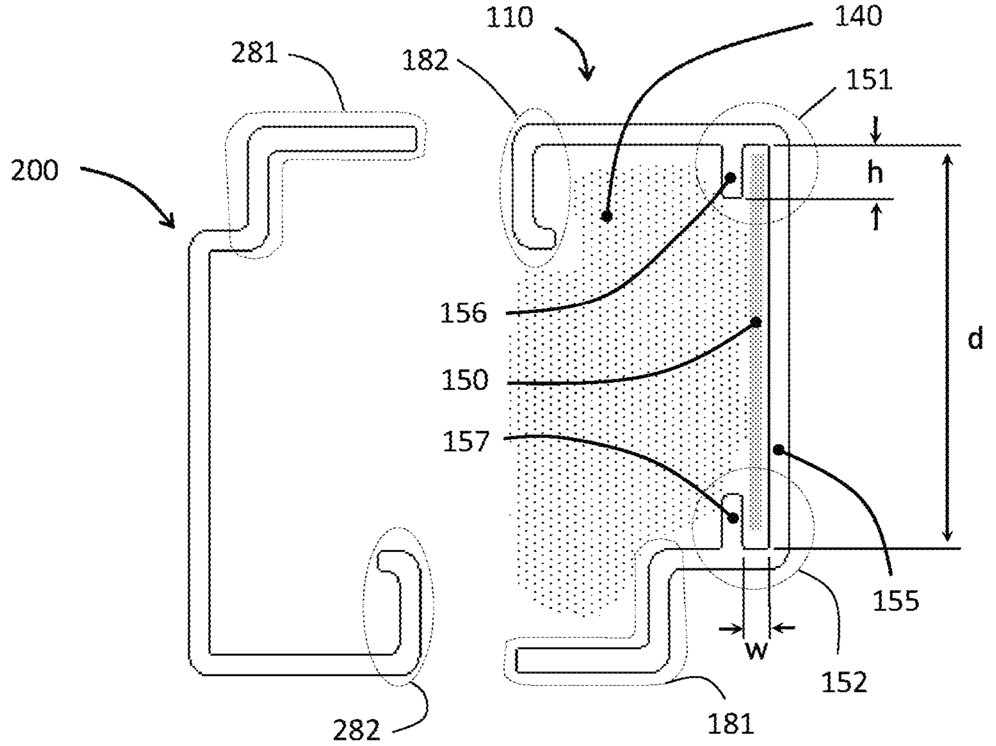
FIG. 1 shows a comparison of a mounting rail 200 and a guide rail 110.

FIG. 1 shows a mounting rail 200 (left) and a guide rail 110 (right). The illustration corresponds to a state before the two profiles are hooked in and locked. A solar module or a substructure are omitted in this illustration. The first end section (top) 281 of the mounting rail 200 is designed as an angled element, the other end section 282 (bottom) is hook-shaped. The C-shape of the mounting rail 200 opens to the right in the drawing, while the guide rail 110 opens to the left. The opening between the end sections 181 and 182 and the essentially box-shaped profile of the guide rail 110 form an inner space 140. Part of this inner space 140 is occupied by the guide 150, which is marked here as a vertical element. In the assembled state, this space would be occupied by the first section 121 or 131 of a holder 120 or 130 (not explicitly shown). In the exemplary embodiment, the guide is formed here by two U-shaped grooves 151 and 152 facing each other, which are arranged opposite each other at a distance d such that their openings are aligned. The lower groove 152 in the figure consists of a left (second) side wall 157 and the outer wall of the guide rail 110, which forms the right (first) side wall 155. The distance between the side walls is marked with w. The second (upper) groove 151 uses the same outer wall as side wall 155, but has its own second side wall 156. The height h of the two side walls is chosen to be the same here. This is advantageous in terms of production technology, but is not mandatory. The height h is usually selected so that the function of the guide 150 is guaranteed. An excessively high design (large h) is not necessarily conducive to the stability of the second side walls 156 and 157 and increases the risk of jamming of an inserted first holder section.

The distance d, measured from groove bottom to groove bottom, corresponds to the width b of a holder section within the limits specified above.

It is also advantageous to match the profiles of the mounting rail and guide rail on the one hand, as well as the guide rail and the width of the first section 121, 131 of the holder 120, 130, so that the design of the guide 150 does not become too complex. The size and weight of the solar cell module to be mounted also play an important role here.

Figure 2:
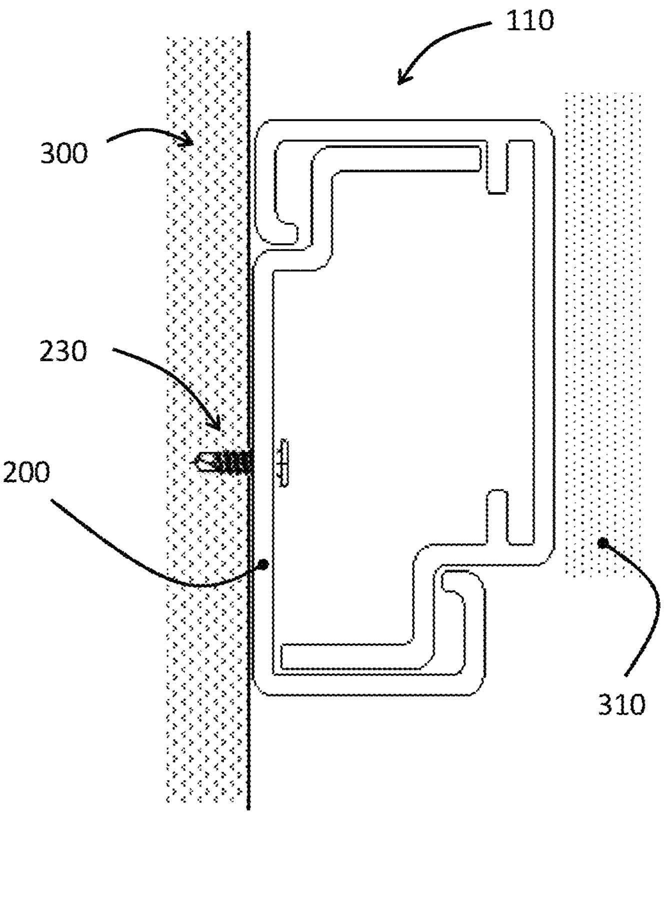
FIG. 2 shows a mounting rail 200 and a guide rail 110 in the suspended, locked state.

FIG. 2 shows a mounting rail 200 and a guide rail 110 installed in a cross-section. A holder is not shown here. The position of a solar module 130 is indicated, as is the position of a substructure 300, to which the mounting rail 200 is fastened here with the aid of a screw 230. The substructure can be made of wood, aluminum or steel profiles, for example. The type and dimensions of this supporting structure are determined by building regulations and safety specifications and are designed accordingly. FIG. 2 shows in particular how the end sections 181, 182, 282, 281 (not marked again here) interlock.

Figure 3:
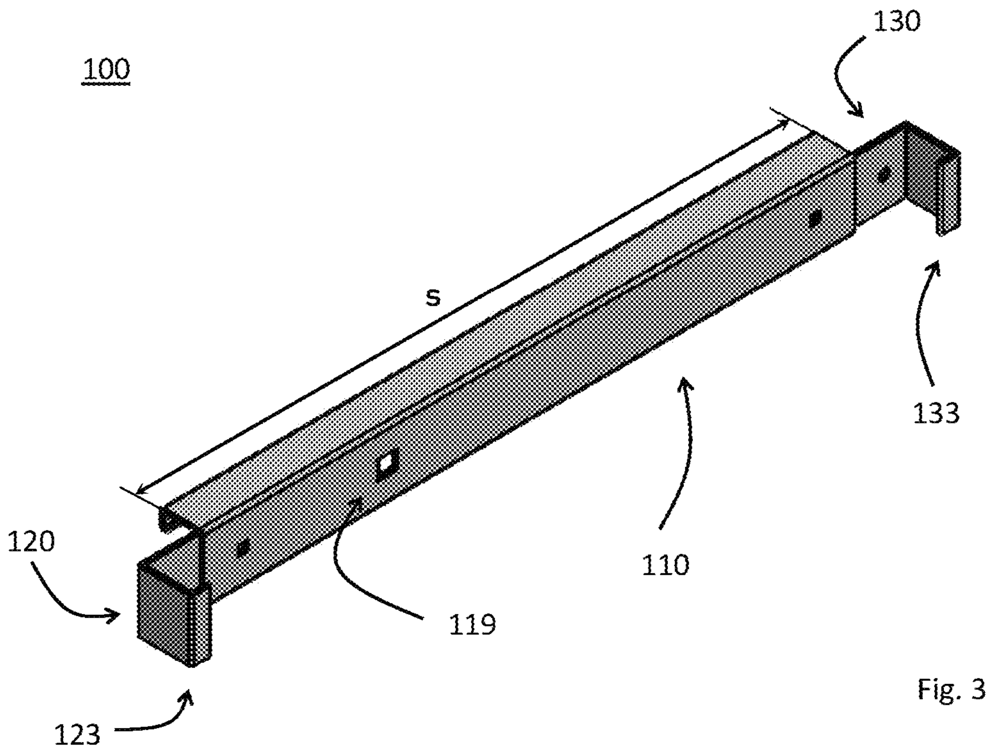
FIG. 3 shows a 3D view of a guide rail 110 with inserted holders 120 and 130 from the panel side.

FIG. 3 shows an oblique 3D plan view of a guide rail 110 with inserted holders 120 and 130 from the front. The opposing gripping sections 123, 133, which complement each other to form a clamp, form the receiving space for a solar panel or, if required, a similarly dimensioned façade cladding element. A three-sided cut-out is marked with reference sign 119. The tongue thus formed is provided with an opening as an eyelet during the manufacturing process and bent at right angles (to the rear in the drawing). The length s of the guide rail 110 is protruded on both sides by the holders 120 and 130, so that the guide rail 110 remains invisible from the (intended) panel side.

Figure 4:
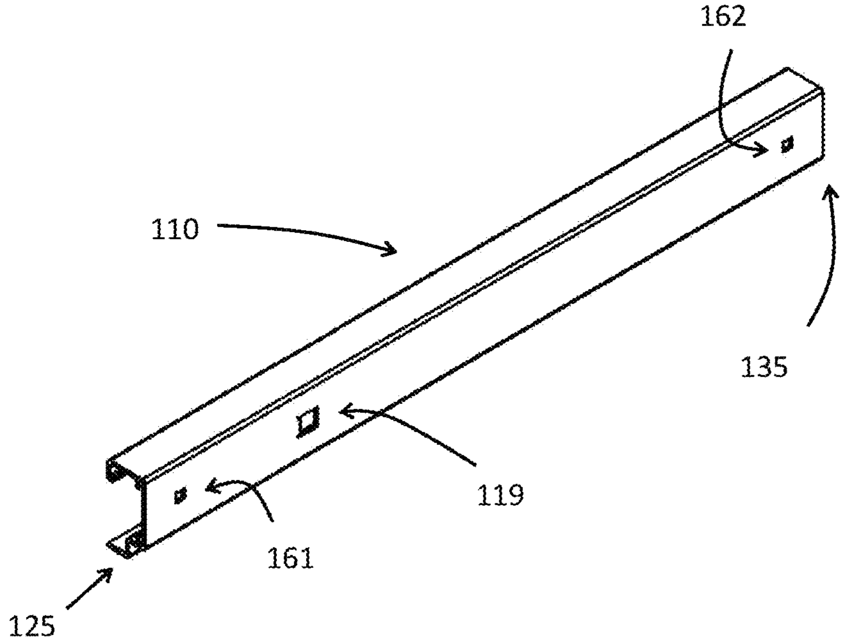
FIG. 4 shows a guide rail 110 without holders.

FIG. 4 shows a guide rail 110 without mounted holders. Reference is made to the position of the open longitudinal ends 125, 135. The openings 161 and 162 are shown as square cut-outs, which allows the use of non-rotating carriage bolts to secure the holders to the guide rail.

Figure 5:
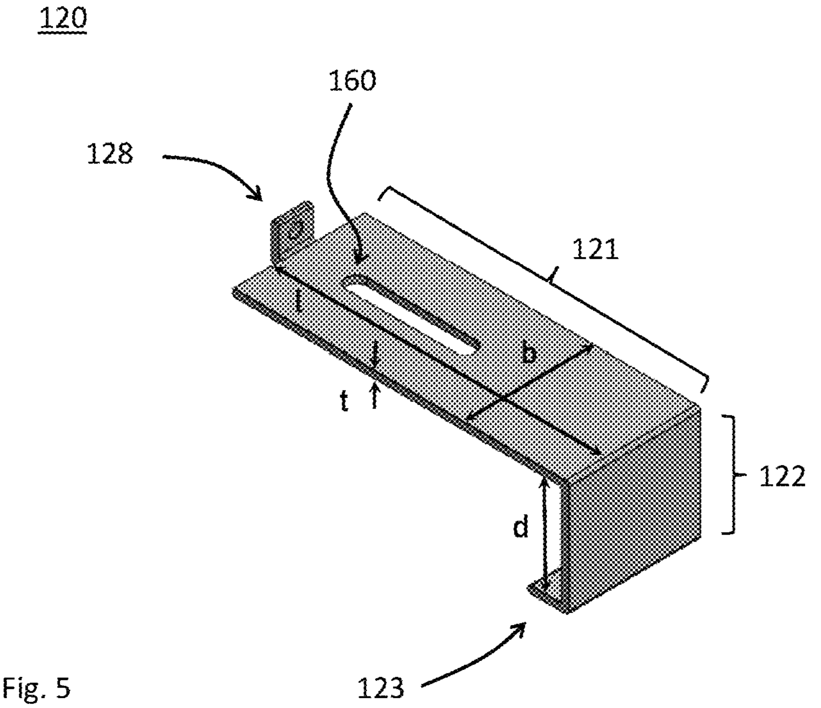
FIG. 5 shows a first holder 120.

FIG. 5 shows the first L-shaped holder 120. It consists of the first leg 121 (first section) and the second section 122, which is arranged at right angles to it and merges into the gripping section 123. The gripping width d corresponds to the frame depth of a solar panel to be held. The first leg has the dimensions l×b with a thickness t. The thickness t and width b are necessarily the same for both holders because both use the same guide 150 in the guide rail 120. The first section 121 is equipped with an elongated hole 160. In addition, the second tab 128 is attached to the open end of the first section 121. It is also shown as a punched and bent element.

Figure 6:
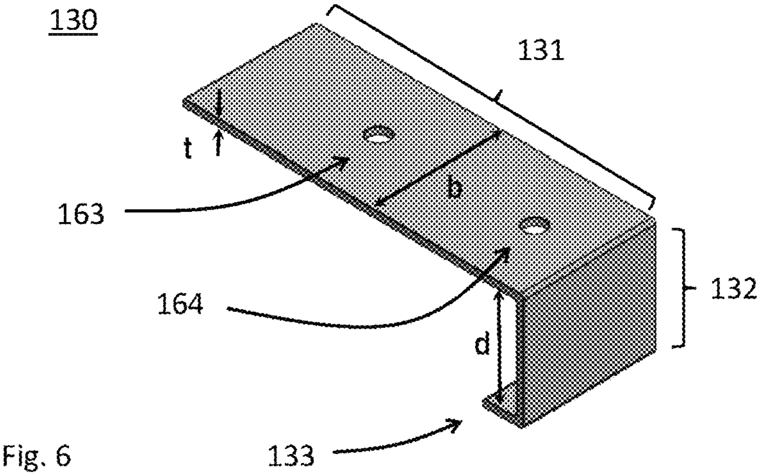
FIG. 6 shows a second holder 130.

FIG. 6 shows the second holder 130, which has a simpler design than the first holder 120. Instead of an elongated hole, the first section 131 in the embodiment shown has two normal holes 163 and 164. An eyelet is not provided. The gripping section 133 is designed identically to the first holder 120 (FIG. 5).

Figure 7:
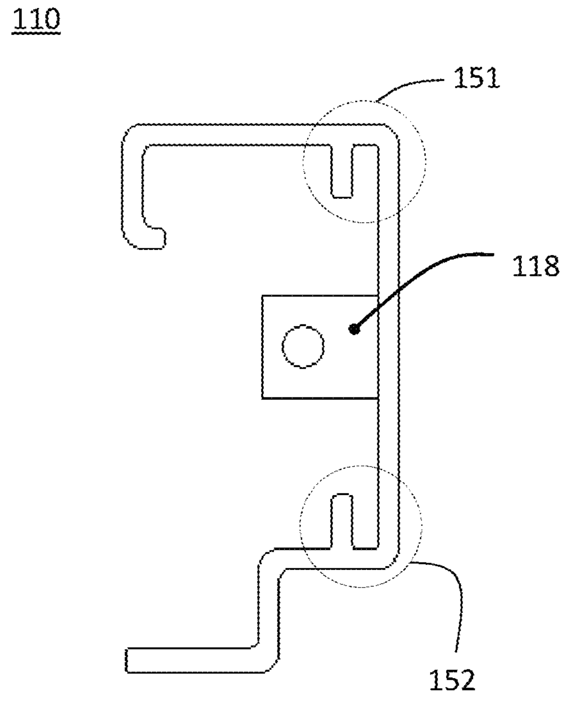
FIG. 7 shows a top view of an end piece of a guide rail 110.

FIG. 7 shows a top view of a cross-section or longitudinal end 125 of a guide rail 110. The position of a first eyelet 118 in the depth or course of the profile is marked. The position of the grooves 151 and 152 is also highlighted.

Figure 8:
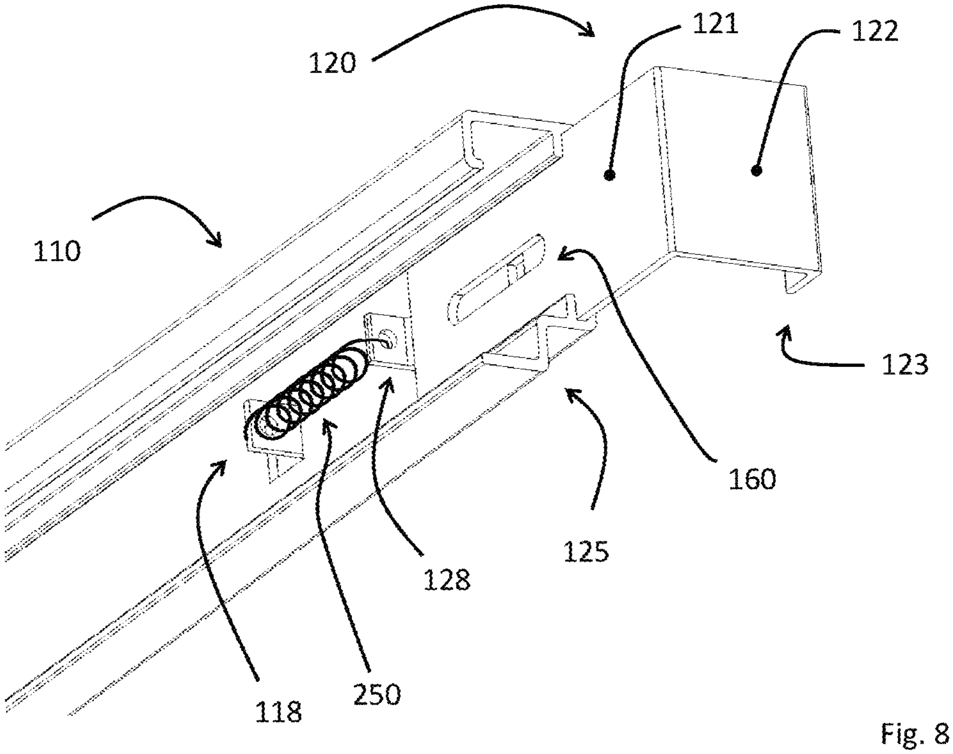
FIG. 8 shows a combination of guide rail 110 and first holder 120, connected via spring 250.

Finally, FIG. 8 shows a combination of guide rail 110 and holder 120 in perspective view. A holder 120 is inserted with the first section 121 in the guide 150 (not marked). The second section 122 with its gripping section 123 projects beyond the longitudinal end 125 of the guide rail 110. The two eyelets 118 and 128 are connected by a suspended spring 250, which exerts a tensile force from the guide rail 110 onto the holder 120. The elongated hole 160 allows a view of a square opening 161 (itself not marked) made in the guide rail.

Finally, an assembly process is briefly described as an example: A guide rail 110 dimensioned according to the specifications for a solar cell panel and two holders 120, 130 are prepared. The second holder is inserted as shown in FIG. 3 on the right and screwed to opening 163 or 164 via opening 162. A first holder 120 is then inserted into the other end of the guide rail 110 in the guide 150. A loose screw-nut connection is prepared through the elongated hole 160 and the opening 161 (not mandatory depending on the load case). A spring 250 can then be hooked in as shown in FIG. 8. If the dimensions of the solar cell module to be mounted are known, this pre-assembly can be carried out by the manufacturer or installer.

The solar cell module can then be inserted into the clamping arrangement. For this purpose, the end of the clamping arrangement with the second, fixed holder is preferably hooked onto the frame of the solar cell module. The first holder is pulled out of the guide against the tension spring force until the gripping section can be guided over the other frame part. The spring is then released until the gripping section rests positively against the frame. The clamping arrangement is thus in contact with the solar module. Depending on the specifications, the gripping section can also be provided with damping strips/compensating elements/adhesives on the inside where it touches the frame.

Depending on requirements, a second clamping arrangement can be attached to the solar cell module in the same way. The position of both clamping arrangements can be fine-tuned, e.g. by using a positioning gauge on the frame.

A higher fastening quality can be achieved if the aforementioned screw connection is tightened through elongated hole 160 and opening 161. The clamping force and position predetermined by the choice of spring is fixed in this way. Depending on the specifications, additional mechanical securing can be provided between the gripping section and the frame of the solar panel, e.g. by gluing or screwing.

A particular advantage of the inventive clamping arrangement is that, due to its design, it can be installed by a single fitter in the manner described. Due to the pre-assembly, the panels can be installed on the construction site—with an existing substructure—by simply hooking the guide rail into the mounting rail.

A non-explicit representation of a combination of features in the drawings or the description does not mean that such a combination is not useful or not possible. Conversely, a common representation of features does not mean that there must always be a structural and/or functional relationship between the features.

The invention claimed is:

1. A clamping arrangement (100) for a solar module, the clamping arrangement comprising:

an assembly having at least one longitudinally extended guide rail which is C-shaped in cross-section and has a length s, and first and second holders, the first and second holders:

are arranged at the longitudinal ends of the guide rail and are fixed in an inner space of the guide rail;

each of the first and second holders is L-shaped, having a first, extended, straight section of length I and width b, and a second section angled thereto and having a gripping section that is adapted to positively grip a frame of the solar module;

the first and second holders and the guide rail have openings for fastening elements for fixing the holders to the guide rail in a secured position;

the inner space of the guide rail has a guide for accommodating the first section of the first and second holders;

the guide has two U-shaped grooves which are spaced apart from each other and define openings that face towards each other, and each of the grooves has a width w and a distance d from groove bottom to groove bottom, so that the first sections of the guide rail are adapted to be displaceably guided in the guide;

wherein a first side wall of the two U-shaped grooves is formed jointly by an outer wall of the guide rail and a second side wall is formed in each case as a separate, rib-shaped projection of height h, which is arranged at a parallel distance w from the first side wall; and the guide rail has a first eyelet which extends at right angles from the first side wall into the inner space of the guide rail.

2. The clamping arrangement according to claim 1, wherein for the second side walls $w<h<5w$ and $2h \ll d$ and $d \lessapprox b$.

3. The clamping arrangement according to claim 1, wherein a position of the holders when arranged in the guide is securable relative to the guide rail via fasteners arranged in correspondingly overlapping ones of the openings in both the guide rail and the first and second holders.

4. The clamping arrangement according to claim 3, wherein the opening in the first holder is an elongated hole.

5. The clamping arrangement according to claim 1, wherein the first holder has a second eyelet arranged on a narrow side of the first section opposite a clamping region, and the second eyelet extends at right angles away from a plane of the first section, and the second eyelet faces into the inner space when the first holder is arranged in the guide of the guide rail.

6. The clamping arrangement according to claim 5, wherein a line of sight through the first and second eyelet extends parallel to a plane of the first side wall of the guide rail.

7. The clamping arrangement according to claim 6, wherein the first and second eyelets comprise stop points for a spring which, when the first holder is installed in the guide, exerts a tensile force between the guide rail and the first holder such that a tensile force acts on the clamping area.

8. The clamping arrangement according to claim 1, wherein the guide rail comprises an extruded aluminum profile with a uniform cross-section.

9. A mounting arrangement for a solar module, comprising:

a clamping arrangement including an assembly having at least one longitudinally extended guide rail which is C-shaped in cross-section and has a length s, and first and second holders, the first and second holders are arranged at the longitudinal ends of the guide rail and are fixed in an inner space of the guide rail, each of the first and second holders is L-shaped, having a first, extended, straight section of length I and width b, and a second section angled thereto and having a gripping section that is adapted to positively grip a frame of the solar module, the first and second holders and the guide rail have openings for fastening elements for fixing the holders to the guide rail in a secured position, and the inner space of the guide rail has a guide for accommodating the first section of the first and second holders;

a mounting rail that is designed to be attached horizontally to a load-bearing substructure; and the clamping arrangement is dimensioned so as to securely grip an edge region or frame of a solar module;

wherein both the guide rail and the mounting rail have a C-shaped cross-sections; and an open end section of the C-shaped cross-sections are shaped to interlock when the guide rail is hooked into the mounting rail, with the openings of the C-shaped cross-sections aligned with one another.

10. The mounting arrangement according to claim 9, wherein first and second end sections of the guide rail and first and second end sections of the mounting rail are designed differently, the first end section of the mounting rail is complementary to and engageable with the first mounting section of the guide rail and the second end section of the mounting rail complementary to and engageable with the second mounting section of the guide rail.

11. The mounting arrangement according to claim 9, wherein two of the guide rails are arranged offset in parallel and are provided for securing the solar panel, and the guide rails engage in two corresponding ones of the mounting rails.

* * * * *